(12) United States Patent
Chen

(10) Patent No.: US 12,709,090 B2
(45) Date of Patent: Aug. 18, 2026

(54) FILM-STICKING AUXILIARY DEVICE FOR MOBILE PHONE

(71) Applicant: SHENZHEN KUKASHI TECHNOLOGY CO., LTD, Shenzhen (CN)

(72) Inventor: Xuewen Chen, Shenzhen (CN)

(73) Assignee: SHENZHEN KUKASHI TECHNOLOGY CO., LTD, Shenzhen (CN)

( * ) Notice: Subject to any disclaimer, the term of this patent is extended or adjusted under 35 U.S.C. 154(b) by 71 days.

(21) Appl. No.: 18/811,532

(22) Filed: Aug. 21, 2024

(65) Prior Publication Data

US 2024/0416636 A1 Dec. 19, 2024

Related U.S. Application Data

(63) Continuation of application No. PCT/CN2023/103410, filed on Jun. 28, 2023.

(30) Foreign Application Priority Data

Jun. 15, 2023 (CN) ........................ 202321537349.X

(51) Int. Cl.
*B32B 37/00* (2006.01)

(52) U.S. Cl.
CPC ...... *B32B 37/0046* (2013.01); *B32B 2457/20* (2013.01)

(58) Field of Classification Search
CPC ........................ B32B 37/0046; B32B 2457/20
USPC .......................................................... 156/391
See application file for complete search history.

(56) References Cited

U.S. PATENT DOCUMENTS 11,685,146 B1 * 6/2023 Zhang ................. B32B 37/0046 156/391

FOREIGN PATENT DOCUMENTS

| | | | |
|---|---|---|---|
| CN | 212606065 | U | 2/2021 |
| CN | 114802893 | A | 7/2022 |
| CN | 217945811 | U | 12/2022 |
| CN | 218431939 | U | 2/2023 |
| CN | 219134650 | U | 6/2023 |
| CN | 219134655 | U | 6/2023 |
| JP | 2021043283 | A | 3/2021 |
| KR | 101623905 | B1 | 5/2016 |

OTHER PUBLICATIONS

International Search Report and Written Opinion issued in corresponding PCT Application No. PCT/CN2023/103410, dated Mar. 13, 2024.

* cited by examiner

*Primary Examiner* — James D Sells
(74) *Attorney, Agent, or Firm* — Westbridge IP LLC

(57) ABSTRACT

Disclosed is a film-sticking auxiliary device for a mobile phone, including a base plate and a cover plate. A lower limit frame is provided on the base plate; the lower limit frame cooperates with the base plate to form a lower accommodation space for placing the mobile phone film and the mobile phone, and a first protrusion is provided on the cover plate; a second protrusion corresponding to the position of the first protrusion is provided in the lower accommodation space.

10 Claims, 8 Drawing Sheets

FILM-STICKING AUXILIARY DEVICE FOR MOBILE PHONE

CROSS-REFERENCE TO RELATED APPLICATIONS

The present application is a continuation application of International Application No. PCT/CN2023/103410, filed on Jun. 28, 2023, which claims priority to Chinese patent application No. 202321537349.X, and filed on Jun. 15, 2023. The disclosures of the above-mentioned applications are incorporated herein by reference in their entireties.

TECHNICAL FIELD

The present application relates to the technical field of film sticking, and in particular to a film-sticking auxiliary device for a mobile phone.

BACKGROUND

Mobile phones have become an indispensable communication tool in people's lives. However, due to the frequent use of mobile phones, the screen of mobile phones is easy to get dirty or even scratched. Generally, mobile phone films (such as tempered glass films) are used to protect the screen of mobile phones. However, when applying tempered glass films, most of them are based on the experience of operators to judge whether the tempered glass films are applied flat and whether they completely cover the mobile phone screen. Such operation may easily cause the tempered glass films to be applied crookedly or require multiple adjustments.

For this reason, Chinese patent CN218499169 U discloses a mobile phone screen film with a pull-strap cleaning function (as shown in FIG. 1), including a tempered film, a tempered film protective film and a hand-tear pull strap. The tempered film protective film is adhered to the surface of the tempered film, and a hand-tear pull strap is provided on the other side of the tempered film protective film. When applying the film, the mobile phone screen film is placed inside the mobile phone positioning frame, and it is ensured that one side of the hand-tear pull strap corresponds to the screen of the mobile phone; and then the mobile phone screen film with the screen film is buckled on the side wall of the mobile phone. At the same time, the hand-tear pull strap is pulled out from the notch at the bottom of the mobile phone positioning frame, which drives the tempered film protective film to be pulled out from between the tempered film and the mobile phone screen. While being pulled out, the tempered film acts on the mobile phone screen to achieve application. During the process of pulling out the tempered film protective film, its adhesive side contacts the mobile phone screen, thereby completing the film application on the mobile phone screen. Although this technology solves the problems of crooked and uneven tempered film application that exist in manual application, it requires the user to press the mobile phone when applying the film, so there is a problem of uneven force; especially the contact part between the tempered film and the mobile phone screen is difficult to bear force, and bubbles are easily left after the film application is completed, resulting in poor film application effect.

SUMMARY

In view of this, the purpose of the present application is to provide a film-sticking auxiliary device for a mobile phone, to solve the problems of easy existence of bubbles and poor film-sticking effect in the existing pull-strap mobile phone screen film during the film-sticking process.

In order to solve the above problems, the present application provides a film-sticking auxiliary device for a mobile phone, including: a base plate; and a cover plate. The base plate is provided with a lower limit frame, and the lower limit frame is configured to cooperate with the base plate to form a lower accommodation space for placing a mobile phone film and the mobile phone. The cover plate is provided with a first protrusion, and the lower accommodation space is provided with a second protrusion corresponding to a position of the first protrusion. In response to that the cover plate and the base plate are correspondingly buckled, the first protrusion is in contact with a back cover of the mobile phone located in the lower accommodation space to form a downward pressure, and the second protrusion is in contact with the mobile phone film located in the lower accommodation space to form an upward pressure.

In an embodiment, a side of the cover plate is movably connected to a side of the base plate so that the cover plate is configured to rotate around a side connection and is correspondingly buckled with the base plate.

In an embodiment, the film-sticking auxiliary device for the mobile phone further includes: a connecting plate with a fold in the middle of the connecting plate; the base plate is arranged on one side of the fold on the connecting plate, and the cover plate is arranged on the other opposite side of the fold on the connecting plate; in response to that the connecting plate is folded around the fold, the cover plate is correspondingly buckled with the base plate.

In an embodiment, the cover plate is provided with an upper limit frame correspondingly buckled with the lower limit frame, and the upper limit frame is configured to cooperate with the cover plate to form an upper accommodation space corresponding to the lower accommodation space.

In an embodiment, the upper limit frame includes two first long frames and two first short frames; the first protrusion is located between the two first long frames in the upper accommodation space; the lower limit frame includes two second long frames and two second short frames; the second protrusion is located between the two second long frames in the lower accommodation space.

In an embodiment, the first protrusion is a strip-shaped protrusion parallel to the first long frame, and the second protrusion is a strip-shaped protrusion parallel to the second long frame.

In an embodiment, the first protrusion is located at a midline of the two first long frames, and the first protrusion is 0~10 mm higher than an inner plane of the upper accommodation space; the second protrusion is located at a midline of the two second long frames, and the second protrusion is 0~10 mm higher than an inner plane of the lower accommodation space.

In an embodiment, a snap-in groove is provided on an outer side of each of four corners of the lower limit frame, and a snap-in column corresponding to the snap-in groove is provided on an inner side of each of the four corners of the upper limit frame.

In an embodiment, a groove for taking and placing the mobile phone is provided on each of the two second long frames.

In an embodiment, a mobile phone anti-misalignment groove is also provided in the upper accommodation space.

The present application has the following beneficial effects.

The present application realizes that the first protrusion contacts the back cover of the mobile phone in the lower accommodation space to form downward pressure through the corresponding buckling of the cover plate and the base plate, and the second protrusion contacts the mobile phone film in the lower accommodation space to form upward pressure, and then the hand-tear pull strap is pulled out from the notch at the bottom of the lower accommodation space, driving the tempered film protective film to be pulled out from between the tempered film and the mobile phone screen. At the same time, due to the above-mentioned pressure, the middle of the mobile phone screen contacts the tempered film and gradually diffuses to the surroundings, thereby forming an exhaust effect from the middle to the edge, so as to ensure that there is no bubble residue after the film is completed.

BRIEF DESCRIPTION OF THE DRAWINGS

In order to more clearly illustrate the technical solution of the embodiment of the present application, the following is a brief introduction to the drawings required for the description of the embodiment. Obviously, the drawings described below are some embodiments of the present application. For those skilled in the art, other drawings can also be obtained based on these drawings without creative work.

DETAILED DESCRIPTION OF THE EMBODIMENTS

The following will be combined with the drawings in the embodiments of the present application to clearly and completely describe the technical solutions in the embodiments of the present application. Obviously, the described embodiments are part of the embodiments of the present application, not all of the embodiments. Based on the embodiments in the present application, all other embodiments obtained by those skilled in the art without creative work are within the protection scope of the present application.

It should be understood that when used in this specification and the attached claims, the terms "include" and "comprise" indicate the presence of the described features, wholes, steps, operations, elements and/or components, but do not exclude the presence or addition of one or more other features, wholes, steps, operations, elements, components and/or their collections.

It should also be understood that the terms used in the specification of the present application are only for the purpose of describing specific embodiments and are not intended to limit the present application. As used in the specification of the present application and the attached claims, the singular forms "a", "an" and "the" are intended to include the plural forms unless the context clearly indicates otherwise.

It should also be further understood that the term "and/or" used in the specification of the present application and the attached claims refers to any combination of one or more of the associated listed items and all possible combinations, and includes these combinations.

First Embodiment

Figure 1:
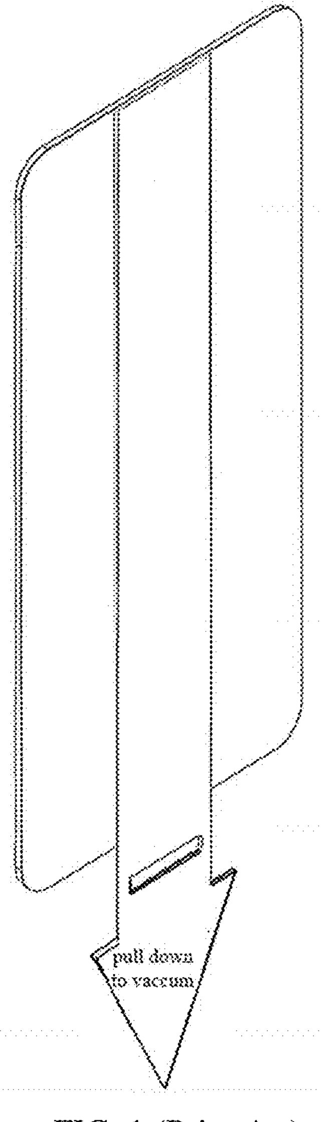
FIG. 1 is a schematic diagram of an existing mobile phone screen film with a pull-strap cleaning function.
Figure 2:
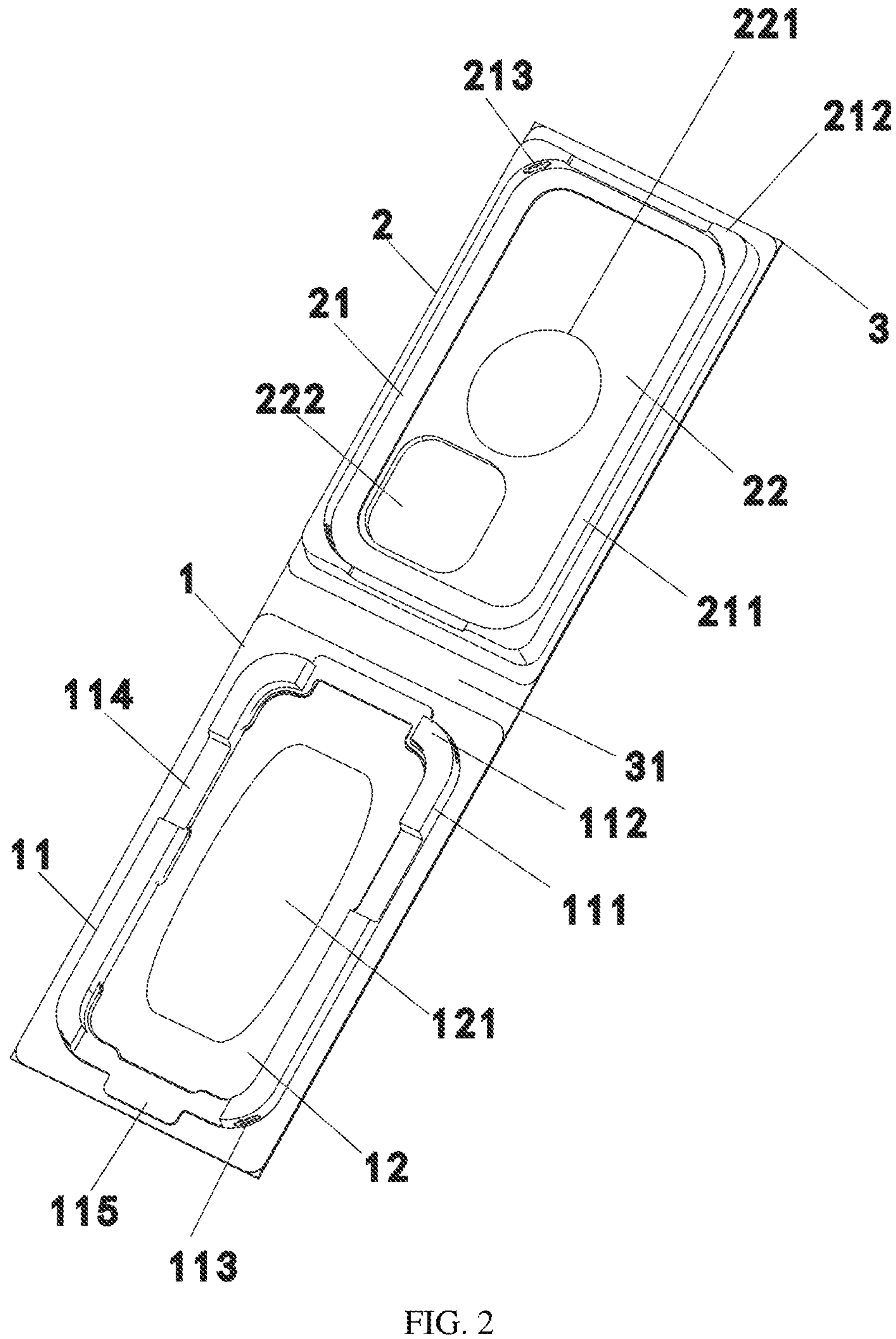
FIG. 2 is a structural schematic diagram according to a first embodiment of the present application.

As shown in FIG. 2, FIG. 2 is a structural schematic diagram according to the first embodiment of the present application.

This embodiment provides the film-sticking auxiliary device for the mobile phone, including a base plate 1, a cover plate 2 and a connecting plate 3; the base plate 1 and the cover plate 2 are both located on the connecting plate 3; a fold 31 is provided in the middle of the connecting plate 3; the base plate 1 is located below the fold 31, and the cover plate 2 is located above the fold 31. When the connecting plate 3 is turned around the fold 31, the cover plate 2 can be correspondingly buckled and fixed together with the base plate 1.

A lower limit frame 11 is provided on the base plate 1, and the lower limit frame 11 cooperates with the base plate 1 to form a lower accommodation space 12 for placing a mobile phone film and a mobile phone.

The lower limit frame 11 includes two second long frames 111 and two second short frames 112 arranged opposite to each other, and the rectangular frame formed by the second long frame 111 and the second short frame 112 is used to fix the mobile phone. A groove 114 is provided on the two second long frames 111 to facilitate the mobile phone to be taken in and out of the lower limit frame 11. A pull-out groove 115 is provided on the second short frame 112 below. When the mobile phone film is placed in the lower limit frame 11, the hand-tear pull strap can be placed in the pull-out groove 115 and the lower limit frame 11 is exposed.

An upper limit frame 21 is provided on the cover plate 2, which can be buckled with the lower limit frame 11. The upper limit frame 21 cooperates with the cover plate 2 to form an upper accommodation space 22, which corresponds to the lower accommodation space 12; the upper limit frame 21 includes two first long frames 211 and two first short frames 212 arranged oppositely.

A snap-in groove 113 is provided on the outer side of each of the four corners of the lower limit frame 11, and a snap-in column 213 corresponding to the snap-in groove 113 is provided on the inner side of each of the four corners of the upper limit frame 21. When the upper limit frame 21 is correspondingly buckled on the lower limit frame 11, the snap-in column 213 is correspondingly buckled with the snap-in groove 113 to ensure that the lower limit frame 11 and the upper limit frame 21 are firmly and stably buckled.

A first protrusion 221 is provided in the upper accommodation space 22; a second protrusion 121 corresponding to the position of the first protrusion 221 is provided in the lower accommodation space 12. When the cover plate 2 and the base plate 1 are correspondingly buckled, the back cover of the mobile phone to be filmed between the lower limit frame 11 and the upper limit frame 21 abuts against the first protrusion 221, and the mobile phone film in the lower limit frame 11 abuts against the second protrusion 121. At this time, the first protrusion 221 forms a downward pressure on the back cover of the mobile phone, and the second protrusion 121 forms an upward pressure on the mobile phone film. At this time, the hand-tear pull strap is pulled out from the pull-out groove 115 at the bottom of the lower accommodation space 12, driving the tempered film protective film to be pulled out from between the tempered film and the mobile phone screen. At the same time, due to the above-mentioned pressure, the middle of the mobile phone screen contacts the tempered film and gradually diffuses to the surroundings, thereby forming an exhaust effect from the middle to the edge to ensure that there is no bubble residue after the film is completed.

In this embodiment, the first protrusion 221 is located at the midline of the two first long frames 211, and the first protrusion 221 is 0~10 mm higher than other planes in the upper accommodation space 22, preferably 2 mm in this embodiment.

Similarly, the second protrusion 121 is located at the midline of the two second long frames 111, and the second protrusion 121 is 0~10 mm higher than other planes in the lower accommodation space 12, preferably 2 mm in this embodiment.

It should be noted that the shape and position of the first protrusion 221 and the second protrusion 121 can be adjusted according to actual conditions. In this embodiment, the first protrusion 221 is circular, and the second protrusion 121 is strip-shaped. They are respectively located at the center of the upper accommodation space 22 and the lower accommodation space 12, so that when the film is applied, the force is more uniform and the exhaust effect is better. Similarly, the shapes of the first protrusion 221 and the second protrusion 121 can also be the same, such as both are circular or both are strip-shaped, which can be different according to the specific use environment and requirements.

In addition, an anti-misalignment groove 222 is provided in the upper accommodation space 22. The position of the anti-misalignment groove 222 varies depending on the model of the mobile phone. When applying a film to the mobile phone, the protrusions such as the camera on the back of the mobile phone can be located in the anti-misalignment groove 222 accordingly, thereby ensuring that the contact surface with the back cover of the mobile phone is a plane to ensure uniform force.

Second Embodiment

Figure 3:
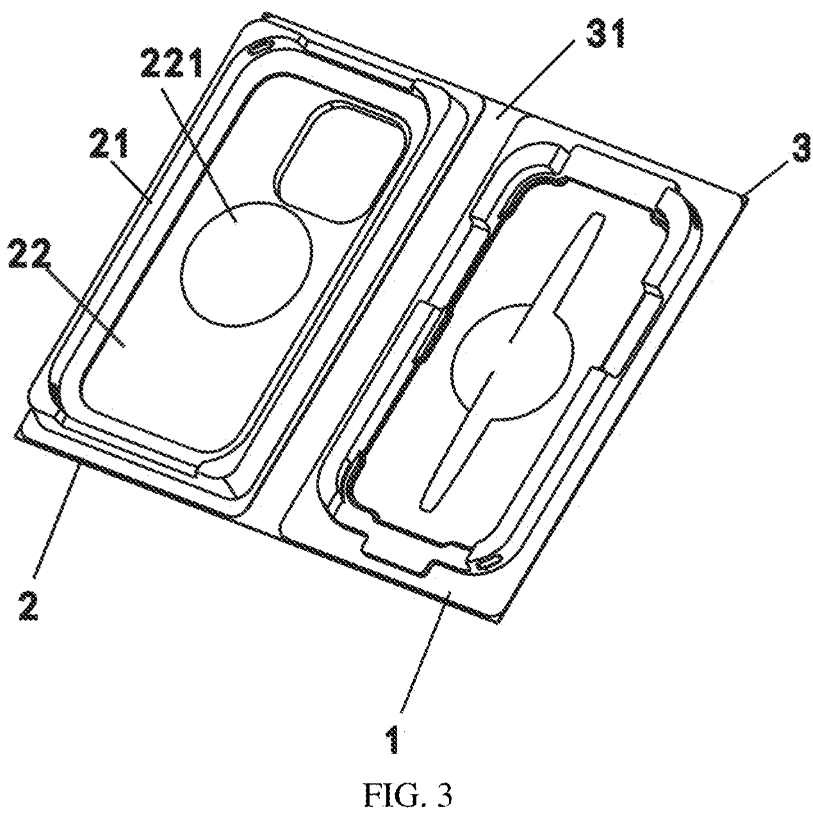
FIG. 3 is a structural schematic diagram according to a second embodiment of the present application.

As shown in FIG. 3, FIG. 3 is a structural schematic diagram according to the second embodiment of the present application.

The film-sticking auxiliary device for the mobile phone of this embodiment includes a base plate 1, a cover plate 2 and a connecting plate 3; the base plate 1 and the cover plate 2 are both located on the connecting plate 3, and a fold 31 is provided in the middle of the connecting plate 3. Compared with the first embodiment, the difference is that the base plate 1 is located on the right side of the fold 31, and the cover plate 2 is located on the left side of the fold 31. When the connecting plate 3 is turned around the fold 31, the cover plate 2 can be correspondingly buckled and fixed together with the base plate 1.

Of course, depending on the specific usage, the base plate 1 can also be located on the left side of the fold 31, and the cover plate 2 is located on the right side of the fold 31. As for the positions and shapes of the anti-misalignment groove 222, the first protrusion 221 and the second protrusion 121, they can be different according to the actual situation. For example, in this embodiment, the first protrusion 221 and the second protrusion 121 are correspondingly circular.

Third Embodiment

Figure 4:
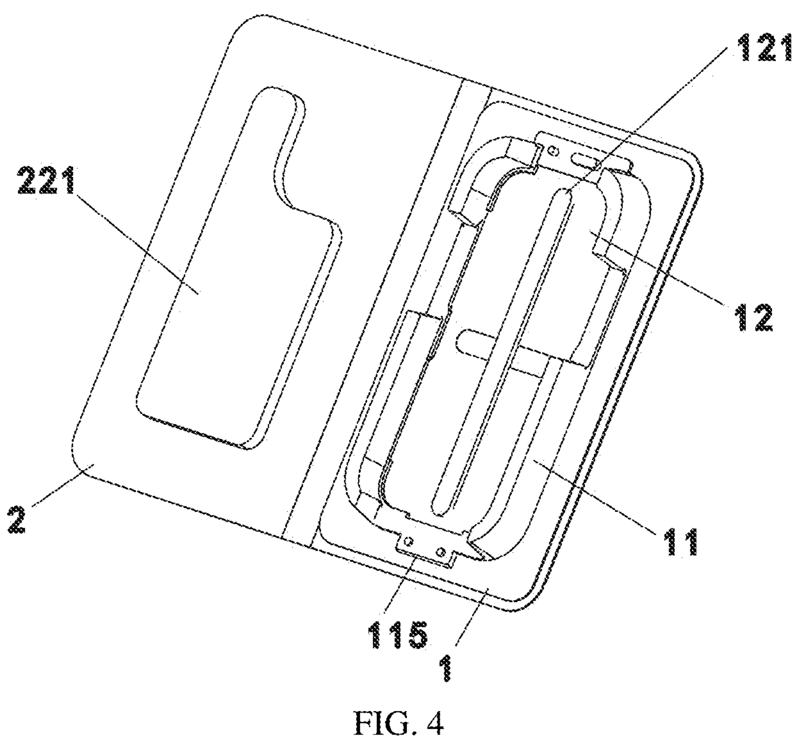
FIG. 4 is a structural schematic diagram according to a third embodiment of the present application.

As shown in FIG. 4, FIG. 4 is a structural schematic diagram according to the third embodiment of the present application.

The film-sticking auxiliary device for the mobile phone of this embodiment includes a base plate 1 and a cover plate 2. The side of the cover plate 2 is movably connected to the side of the base plate 1 so that the cover plate 2 can rotate around the side connection and is correspondingly buckled with the base plate 1. In this embodiment, the base plate 1 and the cover plate 2 are connected together through the left and right sides.

The structure of the base plate 1 is basically the same as that of the first embodiment, while the cover plate 2 is different. A first protrusion 221 is formed on the cover plate 2. The first protrusion 221 and the cover plate 2 form a notch, which is equivalent to the anti-misalignment groove in the first embodiment.

When the base plate 1 and the cover plate 2 are buckled together, the first protrusion 221 in this embodiment contacts the back cover of the mobile phone to be filmed, and the mobile phone film in the lower limit frame 11 of the base plate 1 contacts the second protrusion 121. At this time, the first protrusion 221 forms a downward pressure on the back cover of the mobile phone, and the second protrusion 121 forms an upward pressure on the mobile phone film. At this time, the hand-tear pull strap is pulled out from the pull-out groove 115 at the bottom of the lower accommodation space 12, driving the tempered film protective film to be pulled out from between the tempered film and the mobile phone screen. At the same time, due to the above-mentioned pressure, the middle of the mobile phone screen contacts the tempered film and gradually diffuses to the surroundings, thereby forming an exhaust effect from the middle to the edge to ensure that there is no bubble residue after the film is completed.

Fourth Embodiment

Figure 5:
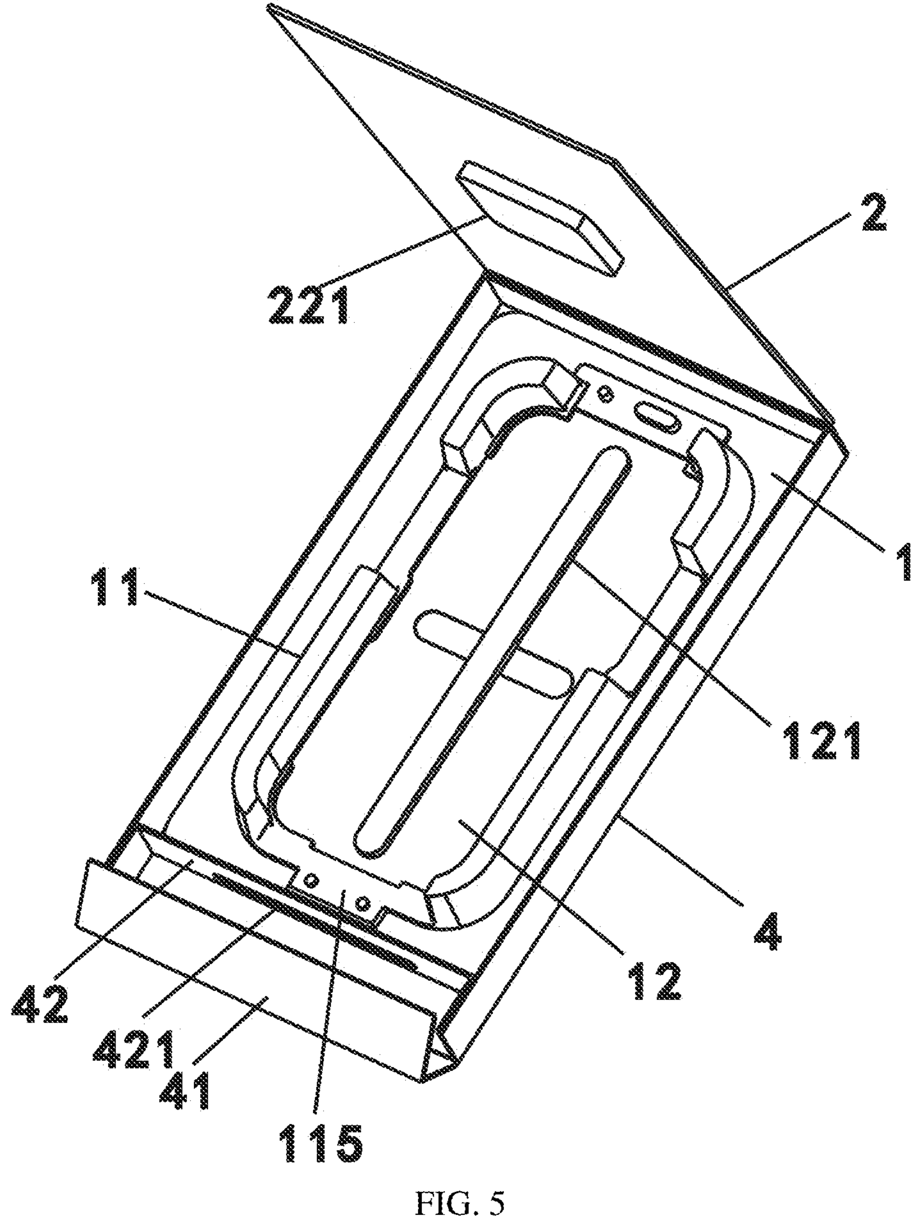
FIG. 5 is a structural schematic diagram according to a fourth embodiment of the present application.

As shown in FIG. 5, FIG. 5 is a structural schematic diagram according to the fourth embodiment of the present application.

The film-sticking auxiliary device for the mobile phone of this embodiment includes a base plate 1 and a cover plate 2, and the side of the cover plate 2 is movably connected to the side of the base plate 1 so that the cover plate 2 can rotate around the side connection and correspondingly buckle with the base plate 1. In this embodiment, the base plate 1 and the cover plate 2 are connected together through the upper and lower sides.

The base plate 1 is provided with an outer frame 4, and the outer frame 4 is provided with a lower limit frame 11. The lower limit frame 11 cooperates with the base plate 1 to form a lower accommodation space 12 for placing a mobile phone film and a mobile phone. The lower limit frame 11 includes two second long frames 111 and two second short frames 112 arranged opposite to each other, and the second long frames 111 and the second short frames 112 are used to form a rectangular frame to fix the mobile phone. A groove 114 is provided on the two second long frames 111 to facilitate the mobile phone to be taken out of the lower limit frame 11. A pull-out groove 115 is provided on the lower second short frame 112. The outer frame 4 is provided with a reversible folded edge 41 near the pull-out groove 115, and a baffle 42 is provided between the folded edge 41 and the pull-out groove 115. The baffle 42 is provided with an opening slot 421 corresponding to the position of the pull-out groove 115.

When not in use, the folded edge 41 is flipped inward to form a sealed cavity with the baffle 42 to prevent dust from entering the film-sticking area. When in use, the mobile phone film is placed in the lower limit frame 11, and the hand-tear pull strap can pass through the pull-out groove 115 and pass out from the opening slot 421. The mobile phone is placed in the lower limit frame 11 to press the mobile phone film. At this time, the cover plate 2 is flipped downward around the side connection to make it correspondingly buckled with the base plate 1; the first protrusion 221 forms a downward pressure on the back cover of the mobile phone, and the second protrusion 121 forms an upward pressure on the mobile phone film. At this time, the folded edge 41 is flipped outward and separated from the baffle 42, exposing the opening slot 421, and the hand-tear pull strap is pulled out from the opening slot 421, driving the tempered film protective film to be pulled out from between the tempered film and the mobile phone screen. At the same time, due to the above-mentioned pressure, the middle of the mobile phone screen contacts the tempered film and gradually diffuses to the surrounding, thereby forming an exhaust effect from the middle to the edge to ensure that there is no bubble residue after the film is completed.

Fifth Embodiment

Figure 6:
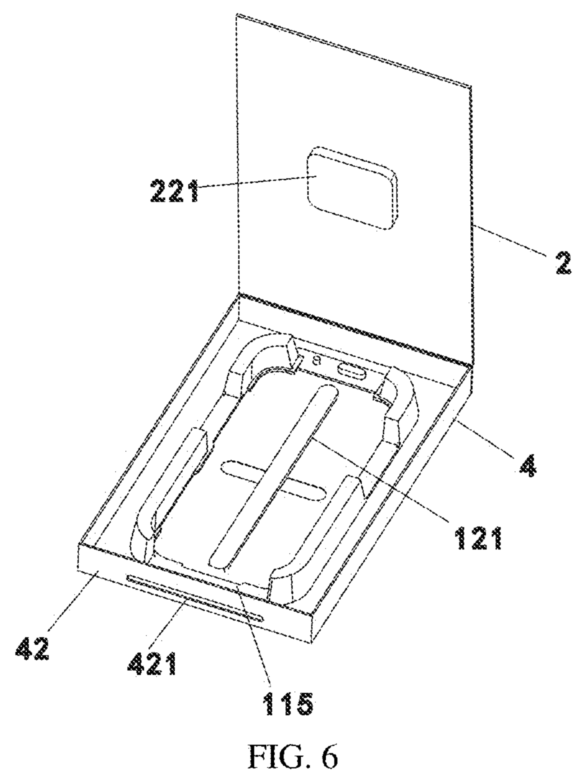
FIG. 6 is a structural schematic diagram according to a fifth embodiment of the present application.

As shown in FIG. 6, FIG. 6 is a structural schematic diagram according to the fifth embodiment of the present application.

Compared with the fourth embodiment, the film-sticking auxiliary device for the mobile phone of this embodiment is only different in that a baffle 42 is provided at a position of the outer frame 4 close to the pull-out groove 115, and an opening slot 421 corresponding to the position of the pull-out groove 115 is provided on the baffle 42.

Sixth Embodiment

Figure 7:
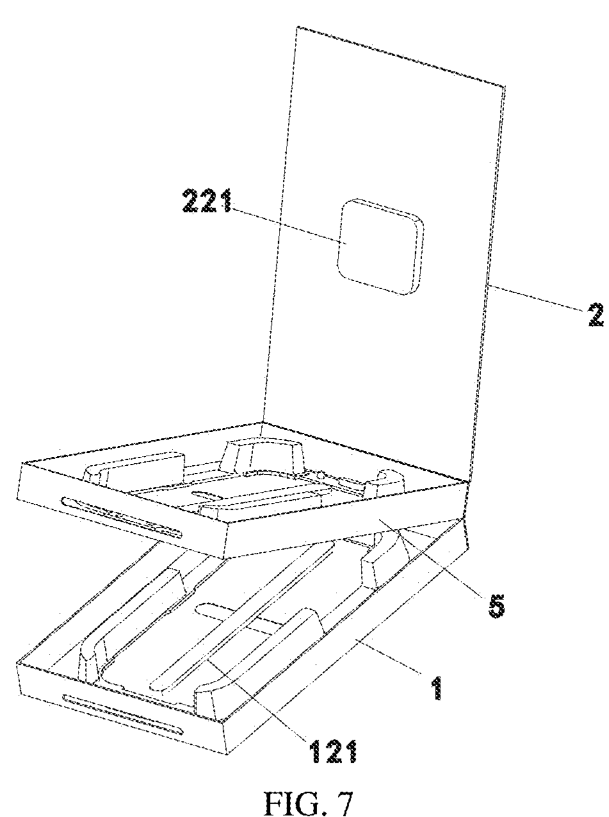
FIG. 7 is a structural schematic diagram according to a sixth embodiment of the present application.

As shown in FIG. 7, FIG. 7 is a structural schematic diagram according to the sixth embodiment of the present application.

Compared with the fifth embodiment, the film-sticking auxiliary device for the mobile phone of this embodiment is only different in that a middle box 5 with the same structure as the base plate 1 is provided between the base plate 1 and the cover plate 2. This design can be used for film sticking of different types of mobile phones. For example, when applying a film to a certain type of mobile phone, the middle box 5 and the cover plate 2 are first fastened together, and then the mobile phone is placed in the lower limit frame 11 of the base plate 1. At this time, the cover plate 2 and the middle box 5 are fastened together, which is equivalent to a new cover plate. The protrusion formed by the bottom of the middle box 5 squeezes the back cover of the mobile phone in the lower limit frame 11 of the base plate 1. At this time, the hand-tear pull strap is pulled out from the pull-out groove 115 to complete the film application on the mobile phone.

Similarly, when applying a film to another type of mobile phone, the middle box 5 and the base plate 1 are first fastened together, and then the mobile phone is placed in the limit frame in the middle box 5. At this time, the protrusion on the cover plate 2 squeezes the back cover of the mobile phone downward, and the other protrusion in the middle box 5 forms an upward pressure on the mobile phone film. At this time, the hand-tear pull strap is pulled out from the pull-out groove of the middle box to complete the film application on the mobile phone.

Seventh Embodiment

Figure 8:
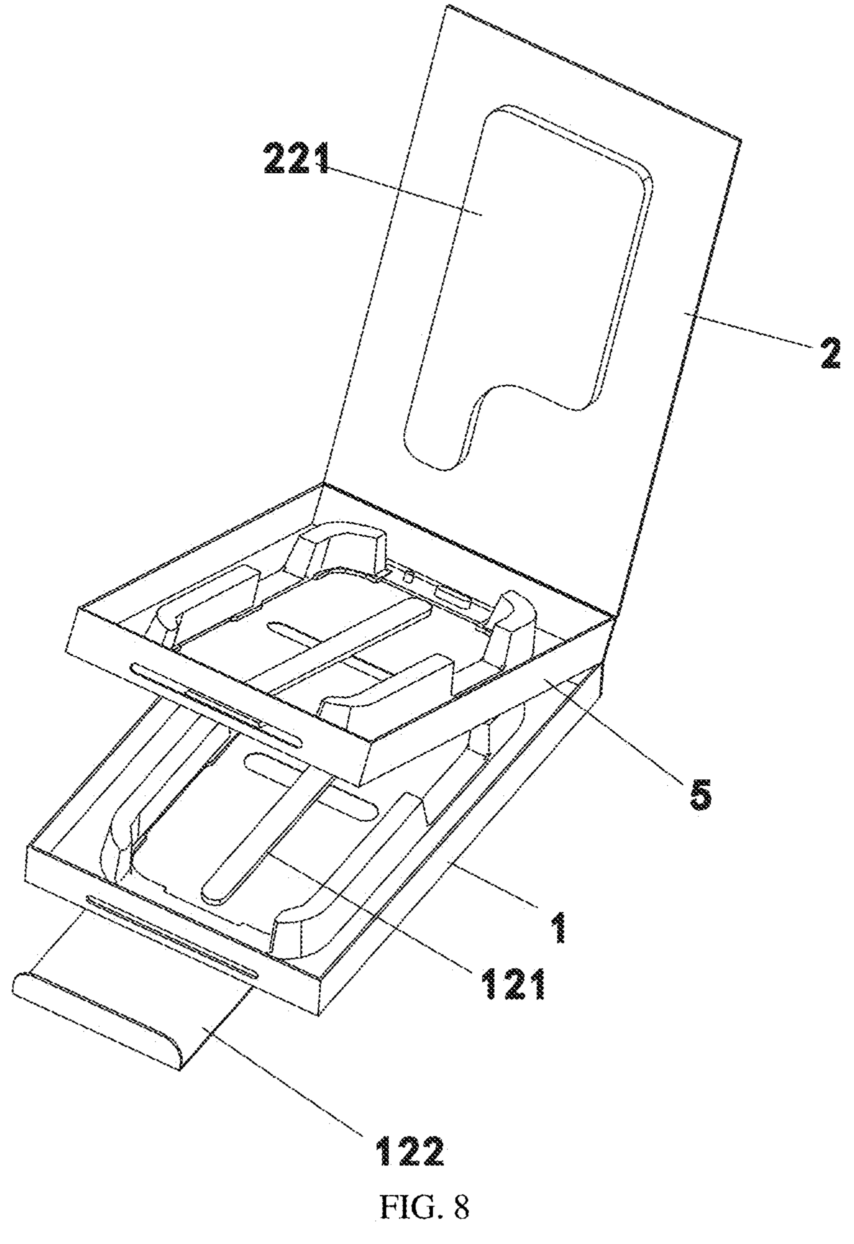
FIG. 8 is a structural schematic diagram according to a seventh embodiment of the present application.

As shown in FIG. 8, FIG. 8 is a structural schematic diagram according to the seventh embodiment of the present application. Compared with the sixth embodiment, the film-sticking auxiliary device for the mobile phone of this embodiment is different in that a buckle 122 is arranged outside the pull-out groove 115 of the lower limit frame 11 of the base plate 1. When the middle box 5, the base plate 1 and the cover plate 2 are buckled and fixed together, the buckle 122 can be used to fix the three to prevent the three from being separated and loosened.

Eighth Embodiment

Figure 9:
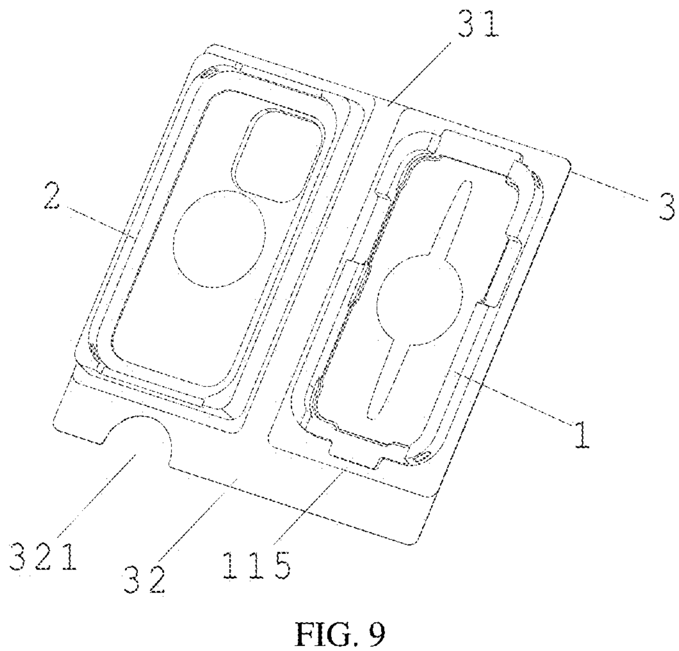
FIG. 9 is a structural schematic diagram according to an eighth embodiment of the present application.

As shown in FIG. 9, FIG. 9 is a structural schematic diagram according to the eighth embodiment of the present application. Compared with FIG. 3 in the second embodiment, the film-sticking auxiliary device for the mobile phone of this embodiment is different in that an extension edge 32 is arranged at the bottom of the connecting plate 3, and a notch 321 corresponding to the position of the pull-out groove 115 is opened at the extension edge 32; when the base plate 1 and the cover plate 2 are buckled and fixed together, the hand-tear pull strap can be pulled out from the pull-out groove 115 by the position corresponding to the notch 321, and the film sticking on the mobile phone can be completed.

Ninth Embodiment

Figure 10:
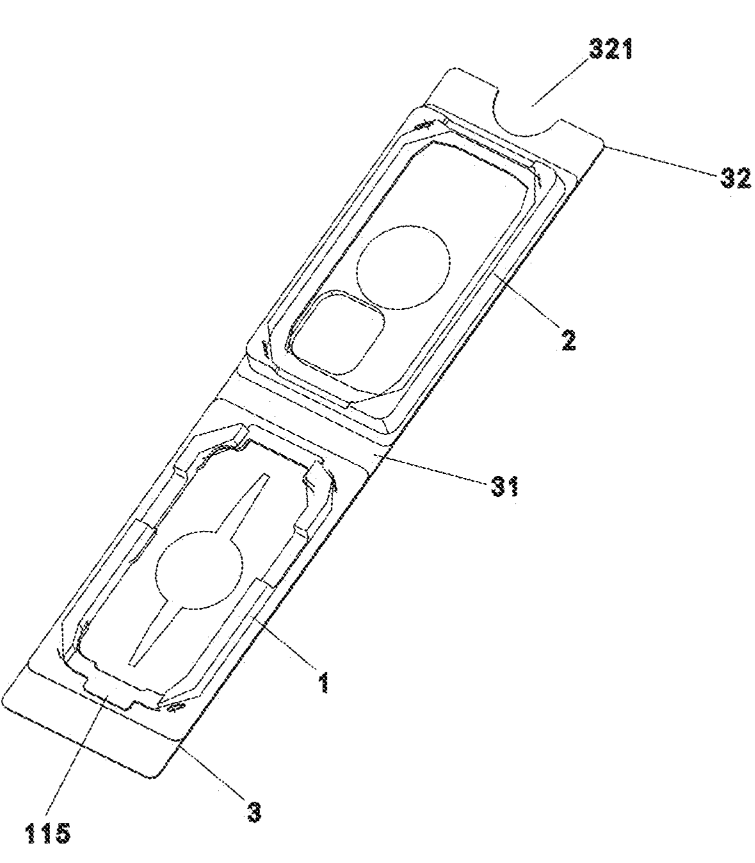
FIG. 10 is a structural schematic diagram according to a ninth embodiment of the present application.

As shown in FIG. 10, FIG. 10 is a structural schematic diagram according to the ninth embodiment of the present application. Compared with FIG. 2 in the first embodiment, the film-sticking auxiliary device for the mobile phone of this embodiment is different in that an extension edge 32 is provided on the upper part of the cover plate 2 located on the connecting plate 3, and a notch 321 corresponding to the position of the pull-out groove 115 is provided on the extension edge 32; when the base plate 1 and the cover plate 2 are buckled and fixed together, the hand-tear pull strap can be pulled out from the pull-out groove 115 through the position corresponding to the notch 321, so that the film sticking on the mobile phone can be completed.

Tenth Embodiment

Figure 11:
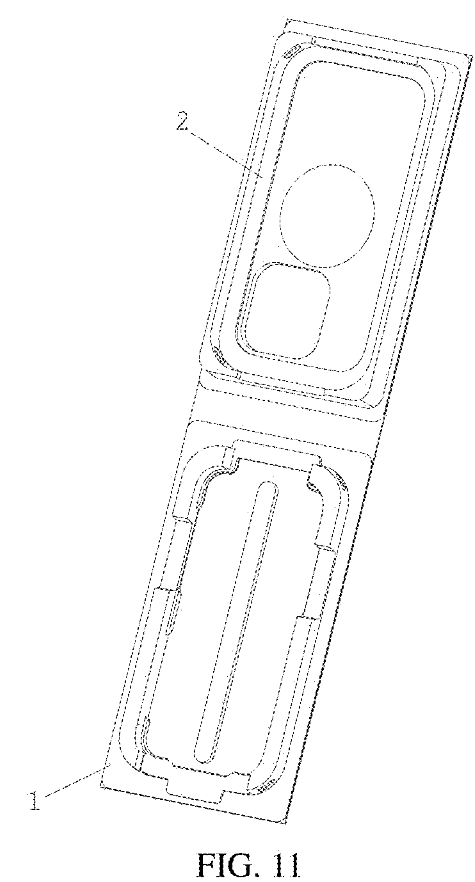
FIG. 11 is a structural schematic diagram according to a tenth embodiment of the present application.

As shown in FIG. 11, FIG. 11 is a structural schematic diagram according to the tenth embodiment of the present application.

Compared with the first embodiment, the film-sticking auxiliary device for the mobile phone provided in this embodiment is different in that the shape of the second protrusion 121 in the lower limit frame 11 is different, and its specific principle is the same as that of the first embodiment.

Eleventh Embodiment

Figure 12:
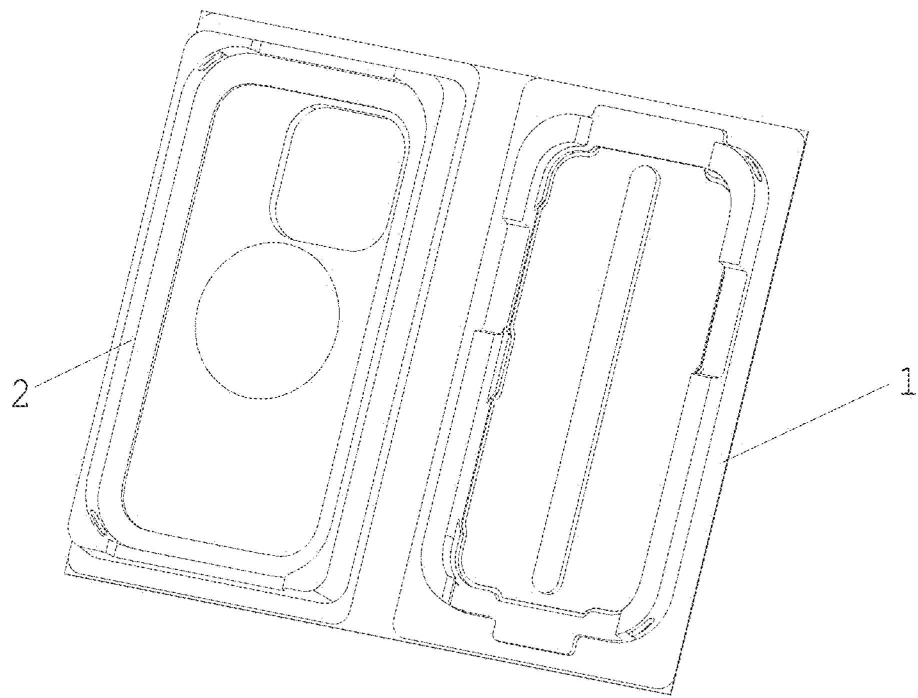
FIG. 12 is a structural schematic diagram according to an eleventh embodiment of the present application.

As shown in FIG. 12, FIG. 12 is a structural schematic diagram according to the eleventh embodiment of the present application.

Compared with the second embodiment, the film-sticking auxiliary device for the mobile phone provided in this embodiment is different in shape from that of the second protrusion 121 in the lower limit frame 11, and its specific principle is the same as that of the second embodiment.

It should be noted that in different embodiments, the protrusion shapes used are different and can be adjusted according to different specific mobile phone models.

The above detailed description of the specific implementation of the present application is only used as an example, and the present application is not limited to the specific implementation described above. For those skilled in the art, any equivalent modification or substitution of the present application is also within the scope of the present application. Therefore, equal transformations, modifications, improvements, etc. made without departing from the spirit and principle of the present application should be covered within the scope of the present application.

What is claimed is:

1. A film-sticking auxiliary device for a mobile phone, comprising:
- a base plate; and
- a cover plate;
- wherein the base plate is provided with a lower limit frame, and the lower limit frame is configured to cooperate with the base plate to form a lower accommodation space for placing a mobile phone film and the mobile phone;
- the cover plate is provided with a first protrusion, and the lower accommodation space is provided with a second protrusion corresponding to a position of the first protrusion; and
- in response to that the cover plate and the base plate are correspondingly buckled, the first protrusion is in contact with a back cover of the mobile phone located in the lower accommodation space to form a downward pressure, and the second protrusion is in contact with the mobile phone film located in the lower accommodation space to form an upward pressure.

2. The film-sticking auxiliary device for the mobile phone according to claim 1, wherein a side of the cover plate is movably connected to a side of the base plate so that the cover plate is configured to rotate around a side connection and is correspondingly buckled with the base plate.

3. The film-sticking auxiliary device for the mobile phone according to claim 1, further comprising:
- a connecting plate with a fold in the middle of the connecting plate, wherein the base plate is arranged on one side of the fold on the connecting plate, and the cover plate is arranged on the other opposite side of the fold on the connecting plate; in response to that the connecting plate is folded around the fold, the cover plate is correspondingly buckled with the base plate.

4. The film-sticking auxiliary device for the mobile phone according to claim 1, wherein the cover plate is provided with an upper limit frame correspondingly buckled with the lower limit frame, and the upper limit frame is configured to cooperate with the cover plate to form an upper accommodation space corresponding to the lower accommodation space.

5. The film-sticking auxiliary device for the mobile phone according to claim 4, wherein the upper limit frame comprises two first long frames and two first short frames; the first protrusion is located between the two first long frames in the upper accommodation space; the lower limit frame comprises two second long frames and two second short frames; the second protrusion is located between the two second long frames in the lower accommodation space.

6. The film-sticking auxiliary device for the mobile phone according to claim 5, wherein the first protrusion is a strip-shaped protrusion parallel to the first long frame, and the second protrusion is a strip-shaped protrusion parallel to the second long frame.

7. The film-sticking auxiliary device for the mobile phone according to claim 6, wherein the first protrusion is located at a midline of the two first long frames, and the first protrusion is 0~10 mm higher than an inner plane of the upper accommodation space; the second protrusion is located at a midline of the two second long frames, and the second protrusion is 0~10 mm higher than an inner plane of the lower accommodation space.

8. The film-sticking auxiliary device for the mobile phone according to claim 4, wherein a snap-in groove is provided on an outer side of each of four corners of the lower limit frame, and a snap-in column corresponding to the snap-in groove is provided on an inner side of each of the four corners of the upper limit frame.

9. The film-sticking auxiliary device for the mobile phone according to claim 5, wherein a groove for taking and placing the mobile phone is provided on each of the two second long frames.

10. The film-sticking auxiliary device for the mobile phone according to claim 4, wherein a mobile phone anti-misalignment groove is further provided in the upper accommodation space.

* * * * *